EQUILIBRIUM ADSORPTION ISOTHERMS FOR "3½A" SIEVE AT 70° F.
(10 mole % K/90 mole % Na)

Nov. 1, 1966 N. H. BERLIN 3,282,028
SYNTHETIC MOLECULAR SIEVES
Filed Jan. 6, 1964 3 Sheets-Sheet 3
FIGURE 3
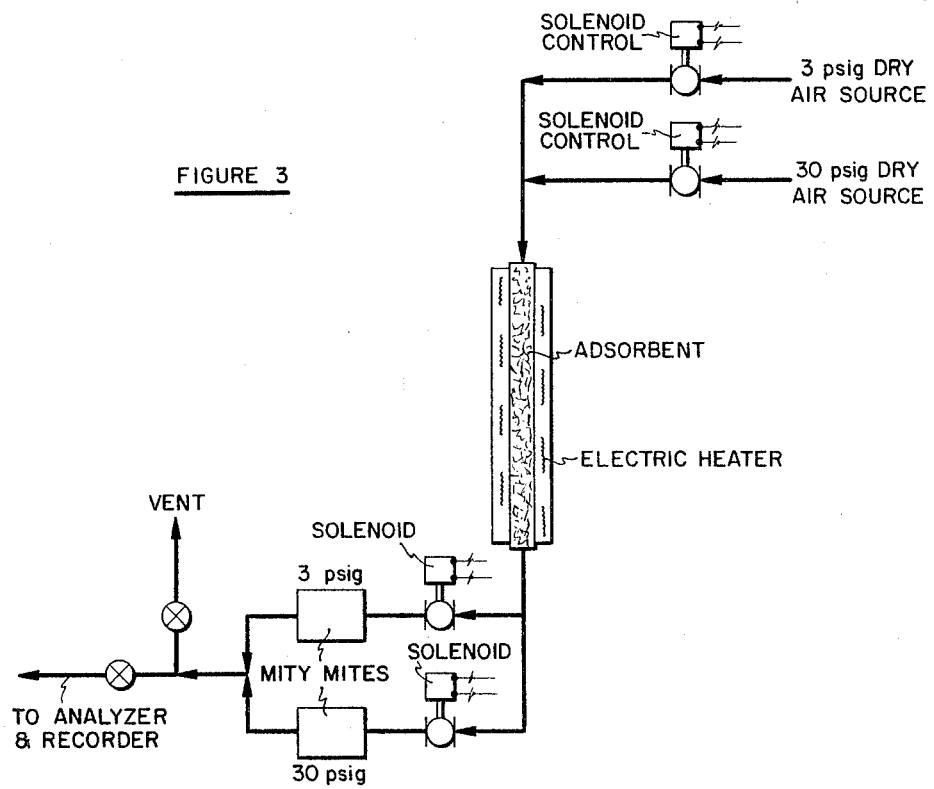
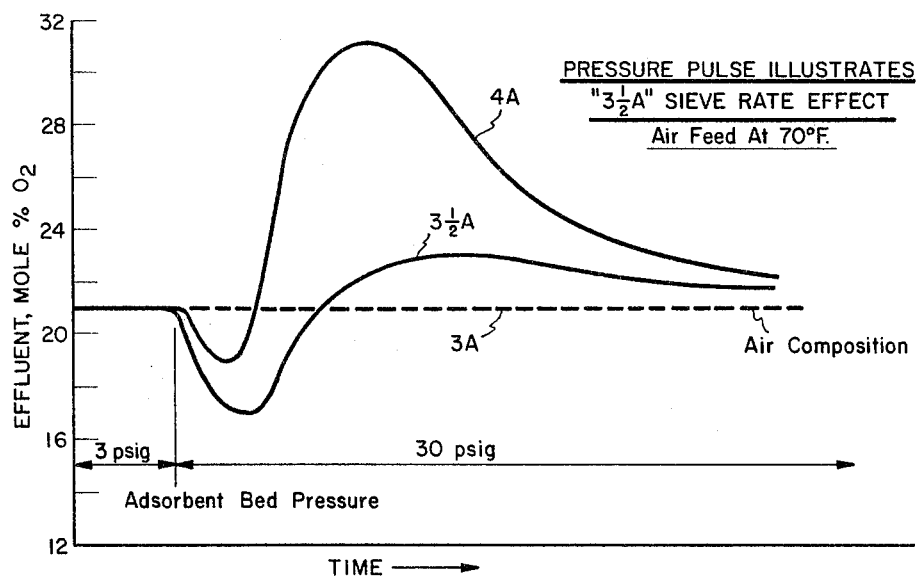
FIGURE 4
NORTON H. BERLIN INVENTOR
BY David A. Roth
PATENT ATTORNEY

United States Patent Office 3,282,028
Patented Nov. 1, 1966

3,282,028
SYNTHETIC MOLECULAR SIEVES
Norton H. Berlin, Matawan, N.J., assignor to Esso Research and Engineering Company, a corporation of Delaware
Filed Jan. 6, 1964, Ser. No. 336,007
12 Claims. (Cl. 55—66)

This invention relates to new crystalline zeolitic, i.e., molecular sieve compositions and methods of preparing them. In particular, it relates to certain exchanges in molecular sieves. More particularly, it relates to a partial cationic exchange of molecular sieve cations to control the rate effect of the molecular sieve.

It has now been discovered and forms the essence of one specific embodiment of this invention that the sodium cation form of the synthetic type A molecular sieve, which is known commercially as 4A molecular sieve, can be exchanged with another ion in a critical manner so as to change the rate effects of the molecular sieve adsorbent. One primary utility of the new molecular sieve which makes up a preferred specific embodiment of the invention is in the separation of nitrogen from oxygen in an adsorption cycle where nitrogen can be produced as a primary effluent.

This application is a continuation-in-part of Serial Number 321,272, filed November 4, 1963, which, in turn, is a continuation-in-part of U.S. application Serial Number 298,647, filed July 3, 1963, both in the name of Norton H. Berlin, which applications are herein incorporated by reference, although so much of said applications as is necessary to understand the present invention will be repeated herein. Synthetic and natural crystalline zeolites are well known to the art and need not be described here.

There is a current interest in inert gas for uses such as blanketing which has created incentives for developing improved methods of purifying nitrogen streams. The heatless adsorption technique of S.N. 298,647 has already been shown to be an effective process for producing 98% $N_2$ from air feed. This process, utilizing the SRX/vacuum cycle disclosed in S.N. 298,647, suffers from the disadvantage of low $N_2$ recoveries since some $O_2$ is concentrated along with $N_2$ in the adsorbed phase and the nitrogen is recovered upon desorption of the adsorbent. Higher $N_2$ recoveries would be feasible if $N_2$ were weakly adsorbed thereby concentrating $O_2$ in the adsorbed phase and allowing $N_2$ to be recovered as a primary effluent.

Dr. C. W. Skarstrom has previously disclosed in U.S. Patent 2,944,627, especially columns 13, 14 and 15 thereof, the application of equilibrium adsorption reversal of $N_2$ and $O_2$ by employing 4A (sodium form) molecular sieve in a very fast heatless adsorption cycle (5 to 15 seconds). However, fast cycling is impractical for commercial application where the necessary relatively large equipment would suffer from inherent inertia.

One sieve of the invention, which is a modification of the 4A sieve, shows good potential for purifying $N_2$ streams, utilizing the principle of equilibrium adsorption reversal.

It is known that the molecular sieve cation plays an important role in the sieving action employed in molecular sieve separations. In addition, the cation has the property of modifying the sieve's internal surface character which affects the selectivity of adsorption of one component over another. It has also been shown that in a few isolated cases a particular cation can affect the rate of adsorption of certain gases. It is believed that this effect is due to the partial blockage of the sieve cage window by the location and size of the cation. An example of this is $N_2$ adsorption on 4A sieve. Adsorption experiments have shown that $N_2$ adsorption is slow, while gases, such as $O_2$ and argon are adsorbed rapidly. Unfortunately, the effect is only a minor one, thereby making it relatively impractical to impede $N_2$ adsorption by fast HA cycling.

For the $N_2/O_2$ system, the adsorption rate has only been associated with the sodium cation form of the "A" molecular sieve (4A). For the case of monovalent cations, exchange of smaller ions, such as lithium, serve only to open the sieve cage window thereby erasing the rate effect. Exchange of larger cations such as potassium, as in the case of 3A molecular sieve, completely block the adsorption of $N_2$, $O_2$, and argon therefore permitting no separation. What is needed is a sieve intermediate between 3A and 4A or "3½A" which would either block completely or greatly retard adsorption of $N_2$ while still permitting rapid $O_2$ and/or argon adsorption.

It is known from molecular sieve analysis, that the 4A sieve cage contains 12 sodium cations with 4 of these located in the vicinity of the sieve cage window. Since each sieve cage has 6 windows or entrance ports, and each of these is shared with an adjoining sieve cage, it becomes apparent that each sieve cage window has aproximately 2 sodium cations associated with it. These particular "window" cations are generally the first to undergo ion exchange and affect the critical dimension of the sieve cage entrance port. My theory is that by partial exchange, that is, by replacing only one of the two critical sodium cations with a larger potassium cation, the sieve cage window can be so adjusted as to permit rapid $O_2$ adsorption, but also severely retard $N_2$ adsorption.

It has been found that about 9 to 11, preferably about 10% of the sodium cations should be replaced by potassium cations to produce a "3½A" sieve.

In general, the reaction can be carried out by contacting a molecular sieve with an aqueous solution containing a certain amount of potassium ion with the critical ranges in amount of ions chosen so that about 9 to 11 mole percent of the sodium cations are replaced with potassium cations.

The modified molecular sieve of the invention can also be used for separating carbon monoxide from nitrogen. This characteristic of the sieve is important in the production of inert atmospheres for such things as food and vegetable storage.

Not only is it possible to affect the sieve cage window opening by substituting potassium cations for sodium cations on 4A molecular sieve but the same technique can be applied to other molecular sieves. For example, in S.N. 321,272 it was shown that strontium cations on either "X" or "A" framework sieves gave significantly higher capacity and selectivity for $N_2$ relative to $O_2$ than the sodium form of these sieves. Therefore, a combination of the strontium sieve properties with partial exchange of the windows should produce a sieve with both the optimum internal surface character and sieve cage window size for achieving maximum separation of gaseous components.

Thus, a sieve can be prepared by conventional, substantially complete, ion exchange procedure with the particular cation or cations desired for gaining maximum adsorption of the desired component. This affects the internal surface and subsequently the sieve cage window is adjusted to the desired size by the process of the present invention to facilitate the sieving action for effecting a separation of components. This can be achieved by partial exchange since it is the cations closest to the window which affect the window openings and undergo ion exchange first.

The following sets forth a procedure for preparing a molecular sieve for further improving the $N_2/O_2$ separation via the "3½A" rate effect.

(1) Prepare a strontium-A sieve by exchanging 80 to 100 mole percent of strontium ions in water solution for the sodium ions present in a 4A sieve.

(2) Using dilute sodium chloride solutions, partially exchange only the strontium cations in the windows (30 to 40 mole percent of the total strontium cations). This partially substituted sieve can be used as is, or step (3) as follows can be used.

(3) Repeat the above partial exchange procedure using dilute potassium chloride solutions to replace only one of the two sodium cations in the window by a potassium cation.

The above procedure will produce in step (3) strontium-A sieves with "3½A" rate characteristics. In addition, the sieve of step (3) would increase oxygen adsorption capacity by about 50% by virtue of the sperior properties of the strontium cation relative to the sodium cation. The result is, in effect, multiple cation exchange.

The basic principle to be extrapolated from the above will find application to other systems where adsorption characteristics and sieve openings can be tailored to suit the desired gaseous separation.

(6) The solution was decanted and the sieve was washed three times with 200 ccs. of D.I.W. at 150° F.

(7) The wash water was decanted and steps (4) to (6) were repeated until the KCl solution was used up.

(8) The sieve was washed thoroughly using at least five washes of 200 ccs. each of D.I.W.

(9) The excess water was removed by heating to 200° F. and purging with $N_2$.

(10) The resulting sieve composition was dried by evacuating to <1 mm. Hg vacuum while slowly heating to 200° F. When the vacuum returned to about 1 mm. Hg, the temperature was raised slowly to 700° F. The heating was not too rapid since the sieve crystals can be destroyed by fast evolution of water from within the sieve. The sieve composition was held at 700° F. for at least four hours at <1 mm. Hg.

The above procedure is specific to preparing the "3½A" sieve only in the amount of and type of ion, i.e., KCl used. Simply varying the KCl treat will result in a corresponding variation in the amount of potassium exchanged for sodium. The procedure is also applicable to other sieves and cations.

The results between various partial exchanges with respect to nitrogen-oxygen adsorption characteristics are summarized below in Table I.

*Table I*

PARTIAL EXCHANGE RESULTS

| Run No. | Gms. KCl per 100 gms. 4A | Wt. Percent Na | Wt. Percent[1] K | Total[2] Wt. Percent | Mole Percent K[2] | $N_2/O_2$ Adsorption Characteristics |
|---|---|---|---|---|---|---|
| 1 | 300 | 3.9 | 17.5 | 21.4 | 72.4 | Similar to 3A. No adsorption of $N_2$ or $O_2$. |
| 2 | 100 | 4.9 | 15.8 | 20.7 | 65.2 | |
| 4 | 10 | 6.3 | 13.5 | 19.8 | 55.8 | |
| 3 |  | 11.4 | 4.8 | 16.2 | 20.0 | |
| 9 | 7 | 12.5 | 3.0 | 15.5 | 12.3 | Region of minimum adsorption rate of $N_2$. $O_2$ rate unaffected. |
| 10 | 6 | 12.7 | 2.6 | 15.3 | 10.7 | |
| 7 | 5 | 12.9 | 2.2 | 15.1 | 9.1 | |
| 8 | 3 | 13.4 | 1.4 | 14.8 | 5.6 | |
| 5 | 1 | 13.9 | 0.6 | 14.5 | 2.5 | Similar to 4A. |
| 6 | 0.1 | 14.1 | 0.2 | 14.3 | 0.8 | |
| 11 (Fresh 4A) | 0 | 14.2 | 0 | 14.2 | 0 | |

[1] Based on total weight of sieve.
[2] Based on total sieve cations.

FIG. 3 illustrates apparatus for pressure cycle studies; and

FIG. 4 is a graphic presentation of a comparison of the "3½A" sieve rate effect.

The invention is further illustrated by the following example and the figures of the specification which graphically present some of the results of the example.

EXAMPLE 1

This example was carried out in order to define the effect of the extent of exchange of potassium for sodium cations on the resulting nitrogen, oxygen, and argon adsorption characteristics. The experimental procedure is described below in detail.

(1) One hundred (100) grams of 4A molecular sieve (1/16" extrudate) from Linde Co. was prewet with deionized water (D.I.W.) by pouring the sieve slowly in about 250 ccs. of D.I.W.

(2) The water was then decanted.

(3) An ion exchange solution was prepared by mixing 6 gms. of KCl with 600 ccs. of D.I.W.

(4) Two hundred (200) ccs. of this KCl solution were added to the prewet 4A sieve.

(5) The mixture was heated to 150° F. and held for two hours while purging with $N_2$. The $N_2$ provided blanketing as well as agitation.

Figure 1:
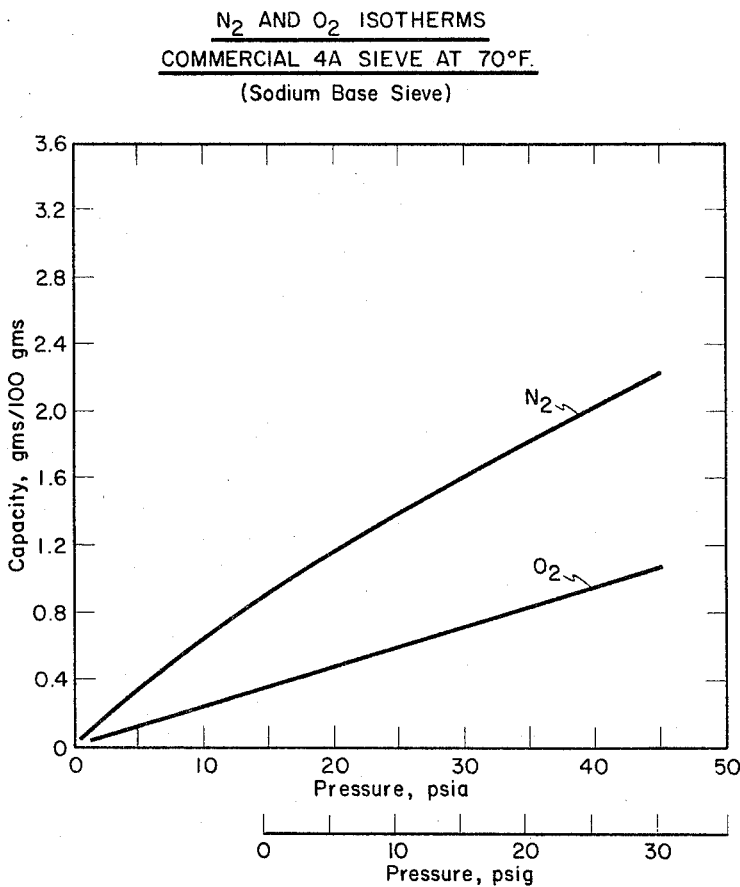
FIG. 1 is a graphic presentation of the $N_2$ and $O_2$ isotherms of a commercial 4A sieve at 70° F.

The molecular sieves produced by partial exchange showed a critical potassium concentration range was necessary to achieve the "3½A" sieve. As illustrated in Table I, >12% of the sodium substituted for by potassium resulted in a sieve with 3A (100% K) adsorption characteristics. These sieves, like 3A, did not adsorb $N_2$, $O_2$, or argon. Sieves with <6% of the sodium replaced by potassium had 4A (100% Na) characteristics, as illustrated by the isotherms shown in FIGURE 1.

Sieves with 9 to 11% K, however, did show the desired "3½A" adsorption characteristics. In this narrow concentration range, $N_2$ adsorption was greater than $O_2$ adsorption as evidenced by the isotherms shown in FIGURE 2. However, it was observed during equilibrium determinations that the rate of $N_2$ adsorption on the "3½A" sieve was considerably slower than on 4A sieve while $O_2$ adsorption was rapid on both "3½A" and 4A sieves.

The adsorption rate characteristics of "3½A" sieve was explored utilizing the pressure pulse technique. This technique was discussed in S.N. 321,272. It simulates the feed step of a heatless adsorption cycle and provides a good qualitative picture of the adsorbent's ability for effecting an $O_2/N_2$ separation. Pressure pulse runs were conducted using the "3½A" sieve. The results were compared with 4A and 3A sieves. The conditions at which the test was run were dry air feed, 3 p.s.i.g. desorption, 30 p.s.i.g. adsorption, and 70° F.

The apparatus of FIGURE 3 illustrates an apparatus for the pressure cycle studies. This apparatus pressures up an adsorbent bed initially equilibrated with flowing air at low pressure to some higher pressure.

The experimental procedure was as follows. The adsorbent to be tested was activated by heating to 600° F. for two hours while purging with dry helium. The reactor was cooled to 70° F. and purged with dried air. The pressure was held constant at 3 p.s.i.g. with a back pressure regulator keeping a constant effluent flow rate. The $O_2$ concentration was monitored by an oxygen analyzer on effluent. The inlet pressure was suddenly increased to 30 p.s.i.g. on both inlet and back pressure regulator. This was accomplished with electric solenoid valves and parallel operated back pressure regulators at 3 and 30 p.s.i.g. After reaching air composition again, the pressure was suddenly reduced back to 3 p.s.i.g. The above pressure cycling was repeated at consistent time intervals.

The resulting $O_2$ pulse curve is a good qualitative picture of the adsorbent's ability for effecting an oxygen-nitrogen separation. The area under the pulse curve above the air feed composition (21% oxygen) is a quantitative measure of the nitrogen working capacity or net oxygen producing capacity and is expressed as XS oxygen or net $O_2$ product (ccs. at S.T.P./100 gms. of adsorbent).

As illustrated in FIGURE 4, the 4A sieve showed only a small rate effect by virtue of the slight $N_2$ enrichment which occurred immediately after the 3 to 30 p.s.i.g. repressure. The $N_2$ enrichment was very quickly overshadowed by $O_2$ enrichment showing the selectivity of the adsorbent based on equilibrium properties. The "3½A" sieve on the other hand, showed a far more pronounced rate effect that the 4A sieve. Only minor effects of the equilibrium characteristics were observed. Almost the entire effluent composition was below air feed composition. As expected, the 3A sieve showed no separation of the air feed. The pulse data pointed out that the "3½A" sieve has good potential for producing $N_2$ rich gas from air during the adsorption or feed step in an HA cycle. The superior rate properties relative to 4A should facilitate higher product rates and recoveries with moderately fast cycles.

Recent heatless adsorption studies showed that production of high purity nitrogen from inert gas generator effluent is limited by CO adsorption. The studies showed that CO could be removed to <50 p.p.m. levels from 2000 p.p.m. in the feed. However, both $N_2$ product rates and recoveries were low. The reason for the poor results was attributed to $N_2$ interference with CO adsorption, as well as the adsorbent's relatively high capacity for $N_2$.

The above conclusions were based on results with conventional molecular sieves such as 13X as well as activated carbons such as HCC. In general, achieving an efficient $N_2$/CO separation on most adsorbents would be difficult due to the similarities between the adsorption properties of these gases. However, there exists a significant difference in the critical dimensions of the $N_2$ and CO molecules which indicates that a separation by size and/or adsorption rate would be feasible. CO is 2.8 A. and $N_2$ is 3.0 A. $O_2$ is 2.8 A., indicating that the CO adsorption rate should be similar to $O_2$ with a "3½A" sieve where $N_2$ adsorption would be impeded.

Figure 2:
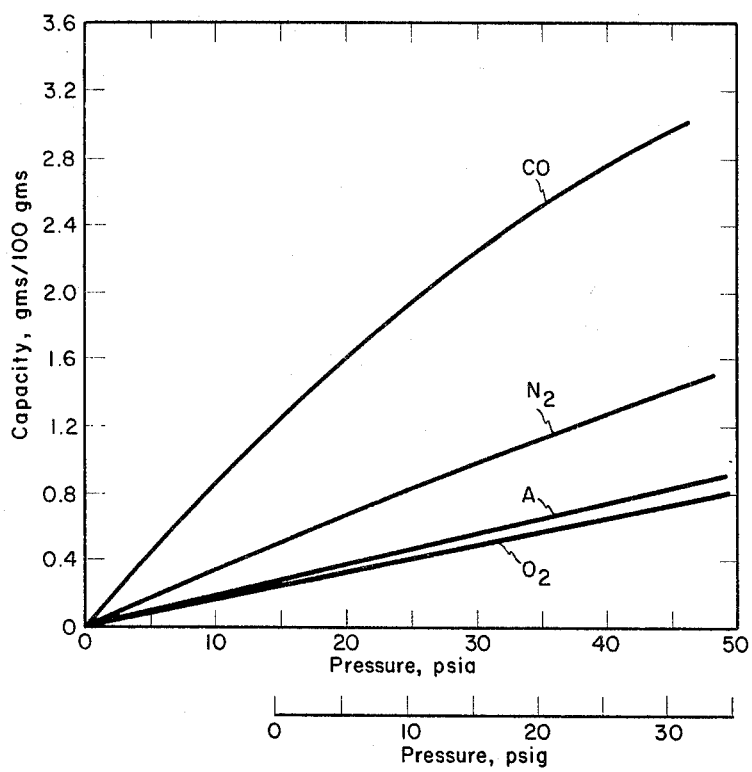
FIG. 2 is a graphic presentation of the equilibrium adsorption isotherms for the "3½A" sieve at 70° F.

Adsorption isotherms shown in FIGURE 2 illustrate that the "3½A" sieve is capable of adsorbing CO more strongly than $N_2$. In addition, it was observed during isotherm measurements, that the rate of approach to equilibrium for CO was similar to $O_2$ and both were considerably faster than $N_2$. Therefore, it can be inferred that the "3½A" sieve can be utilized to effect an efficient separation of CO/$N_2$ mixture heretofore unattainable on conventional adsorbents. This sieve used in conjunction with the heatless adsorption process with reasonably fast cycles (30 secs. to 2 minutes), will provide the necessary CO adsorption characteristics as well as impede $N_2$ adsorption, boosting both product rate and recovery for production of high purity $N_2$.

The "3½A" sieve properties can also find application to an argon removal process for production of high purity $N_2$ for ammonia synthesis gas. The argon contamination problem arises from the use of air for combustion of hydrocarbons which ultimately leads to production of $N_2$ and $H_2$. The $N_2$/argon separation should be analogous to the $N_2$/$O_2$ system discussed previously. This is concluded since $O_2$ and argon were observed to behave similarly from both adsorption rate and equilibrium standpoints on "3½A" sieve.

In summary, a new molecular sieve midway in properties between 3A and 4A can be prepared by partial ion exchange. This sieve, called "3½A" has shown a good potential for improving gas separations such as $N_2$ and $O_2$. The principle centers around impeding $N_2$ adsorption and thereby removing the undesirable component from the $N_2$ stream by adsorption. This presupposes that the undesirable components, such as $O_2$, CO, and/or argon, is smaller than the $N_2$ molecule. The technique of the invention can be used to "tailor make" other molecular sieves.

The concept of adjustment of the sieve cage window by partial exchange of cations in molecular sieves opens up a whole new area for exploration. Molecular sieve adsorbents can be tailored to facilitate the desired separation of components by proper choice of cations. Multiple cation exchange can be used not only to adjust the sieve entrance port, but to modify the internal surface for maximum adsorption.

Although the invention has been described with some degree of particularity, it will be understood that variations and modifications can be made therein without departing from the spirit of the invention as hereinafter claimed. For instance, for separations involving a dry air source, the product purge step of heatless adsorption can be completely eliminated. The separation is simply effected with just a pressure cycle. Moreover, although the adsorption process in which the improved molecular sieves of the invention can be most profitably used in many instances is the heatless adsorption process of U.S. Patent 2,944,627 issued to C. W. Skarstrom, it will be understood that the improved molecular sieve of the invention can be satisfactorily used in other adsorption processes.

What is claimed is:

1. A method of preparing adsorbents suitable for separating nitrogen and oxygen which comprises reacting a 4A synthetic molecular sieve with an ionic solution containing potassium ions having the capacity to replace sodium ions in said molecular sieve with about 9 to 11 mole percent of potassium.

2. A composition prepared by the method of claim 1.

3. A method according to claim 1 wherein the degree of exchange is about 10 mole percent.

4. A method of separating gases selected from the group consisting of oxygen, argon, CO and combinations thereof from gaseous mixtures comprising nitrogen which comprises contacting said gaseous mixtures with the adsorbent of claim 2, adsorbing said constituents of said group on said adsorbent and subsequently desorbing the desorbed constituents from the sorbent.

5. A method of purifying a nitrogen gas containing impurities selected from the group consisting of oxygen, argon, CO and combinations, thereof which comprises contacting said nitrogen gas with impurities with the adsorbent of claim 2, adsorbing said impurities and obtaining a substantially impurity-free nitrogen gas.

6. The composition prepared by the process of claim 3.

7. A method of purifying a nitrogen gas containing impurities selected from the group consisting of oxygen, argon, CO and combinations thereof which comprises contacting said nitrogen gas with impurities with the adsorbent of claim 6, adsorbing said impurities and obtaining a substantially impurity-free nitrogen gas.

8. A method for preparing a sodium/strontium molecular sieve which comprises the following steps in combination:
- (A) preparing a strontium-substituted A sieve by exchanging at least 30 mole percent of the sodium ions in a 4A sieve with strontium ions, and
- (B) exchanging only the strontium cations in the cage windows with sodium ions.

9. A composition prepared according to the process of claim 8.

10. A method according to claim 8 wherein one of said sodium cations in said window is replaced by a potassium cation.

11. A composition prepared according to the process of claim 10.

12. A method of obtaining an oxygen-enriched air stream comprising contacting an oxygen-containing gas with the composition of claim 11 and obtaining an oxygen-enriched primary effluent.

References Cited by the Examiner

UNITED STATES PATENTS

| | | | |
|---|---|---|---|
| 2,882,243 | 4/1959 | Milton | 55—75 |
| 2,930,447 | 3/1960 | Barrer | 55—75 |
| 2,962,355 | 11/1960 | Breck et al. | 55—75 |
| 3,164,453 | 1/1965 | Milton | 55—75 |

OTHER REFERENCES

Breck, D. W., et al.: Crystalline Zeolites I, The Properties of a New Synthetic Zeolite Type A, in Journal of the American Chemical Society 78 (23), pp. 5963–5971, December 8, 1956.

Breck, D. W., et al.: Molecular Sieves, in Scientific American, pp. 85–96, January 1959.

REUBEN FRIEDMAN, *Primary Examiner.*

J. ADEE, *Assistant Examiner.*